(No Model.) 9 Sheets—Sheet 1.

L. G. ROWAND.
AUTOMATICALLY TESTING FIRE ALARM CIRCUITS.

No. 568,493. Patented Sept. 29, 1896.

MAIN STATION

Witnesses.
Jesse B. Heller
Carol H. Deshow

Inventor.
Lewis G. Rowand
M. G. Harding
Attorney.

(No Model.) 9 Sheets—Sheet 2.
L. G. ROWAND.
AUTOMATICALLY TESTING FIRE ALARM CIRCUITS.
No. 568,493. Patented Sept. 29, 1896.
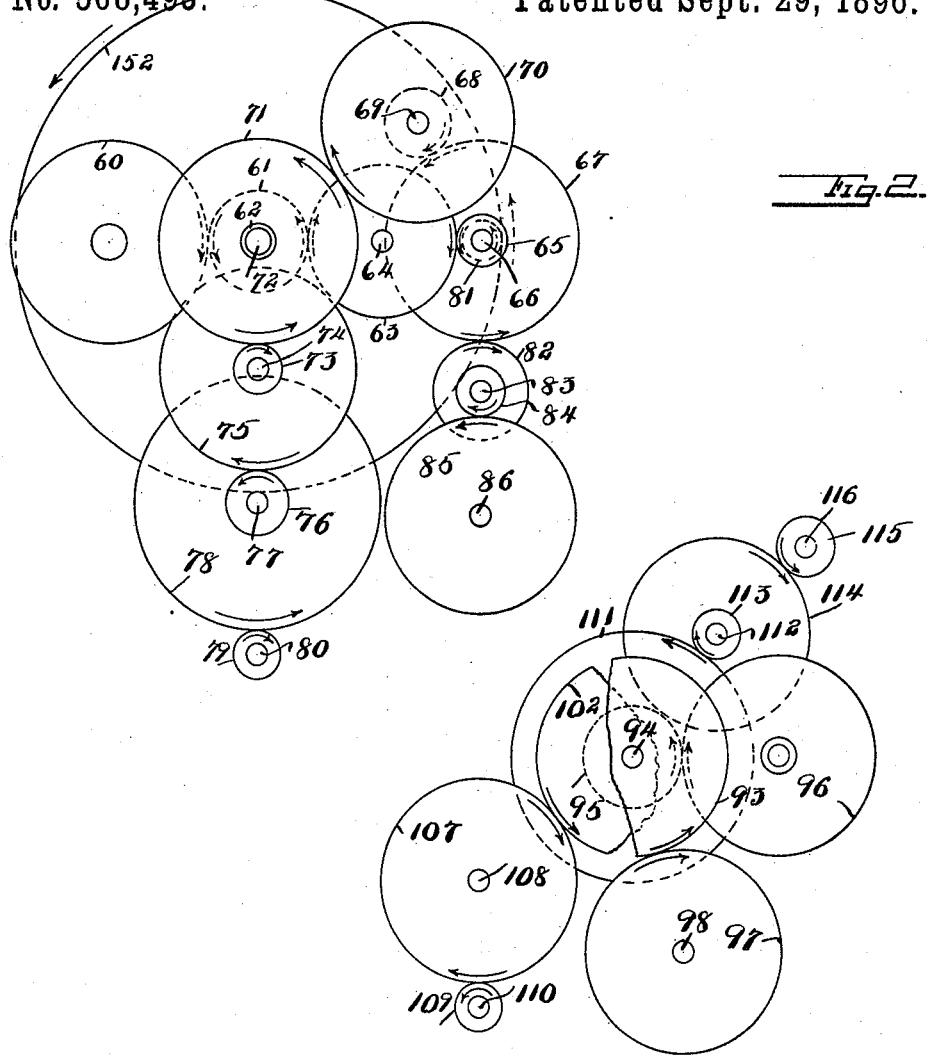
_Fig. 2._
Witnesses.
Jesse B. Heller?
Minnie F. Ellis
Inventor.
Lewis G. Rowand
Attorney.

(No Model.) 9 Sheets—Sheet 3.

L. G. ROWAND.
AUTOMATICALLY TESTING FIRE ALARM CIRCUITS.

No. 568,493. Patented Sept. 29, 1896.

(No Model.)  9 Sheets—Sheet 4.
L. G. ROWAND.
AUTOMATICALLY TESTING FIRE ALARM CIRCUITS.
No. 568,493. Patented Sept. 29, 1896.
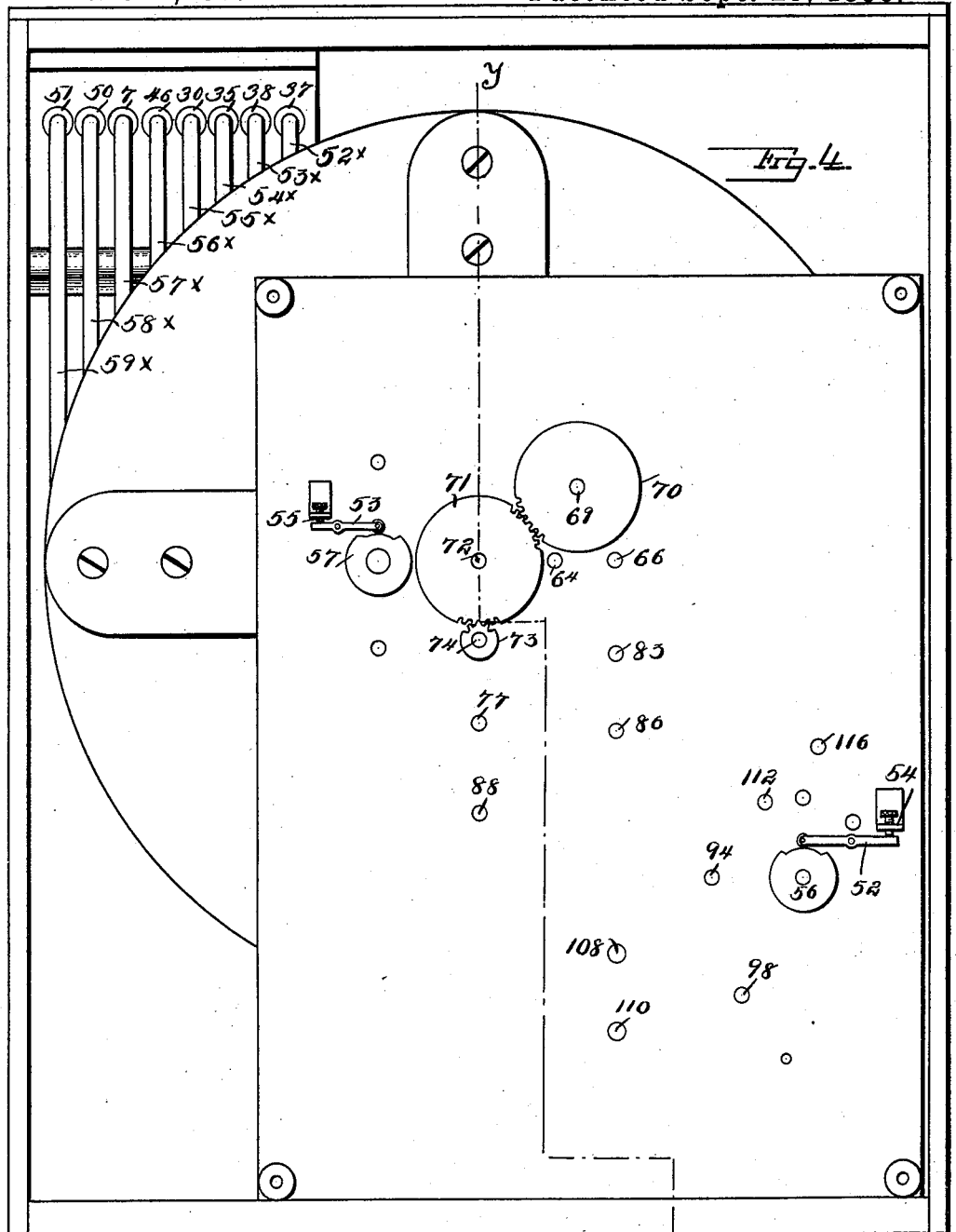
Fig. 4.
Witnesses. Inventor.
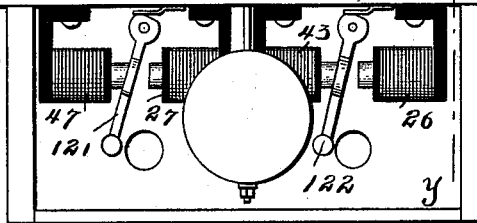
Attorney.

(No Model.) 9 Sheets—Sheet 5.

L. G. ROWAND.
AUTOMATICALLY TESTING FIRE ALARM CIRCUITS.

No. 568,493. Patented Sept. 29, 1896.

Witnesses.
Jesse B. Heller
Monnie F. Ellis

Inventor.
Lewis G. Rowand
G. J. Harding
Attorney.

(No Model.) 9 Sheets—Sheet 6.

L. G. ROWAND.
AUTOMATICALLY TESTING FIRE ALARM CIRCUITS.

No. 568,493. Patented Sept. 29, 1896.

Witnesses.
Jesse B. Heller
Minnie F. Ellis

Inventor.
Lewis G. Rowand
G. J. Harding
Attorney.

(No Model.) 9 Sheets—Sheet 8.

L. G. ROWAND.
AUTOMATICALLY TESTING FIRE ALARM CIRCUITS.

No. 568,493. Patented Sept. 29, 1896.

Witnesses.
Jesse B. Heller
Minnie F. Ellis

Inventor.
Lewis G. Rowand
by
J. G. Harding
Attorney.

(No Model.) 9 Sheets—Sheet 9.
L. G. ROWAND.
AUTOMATICALLY TESTING FIRE ALARM CIRCUITS.
No. 568,493. Patented Sept. 29, 1896.
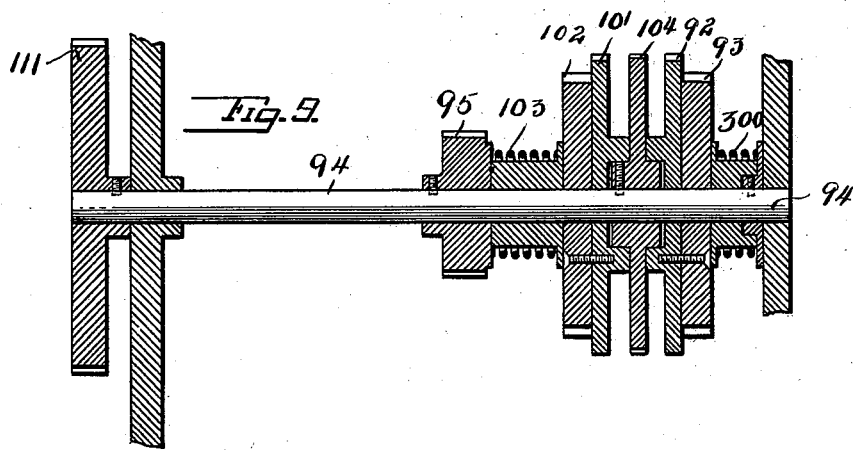
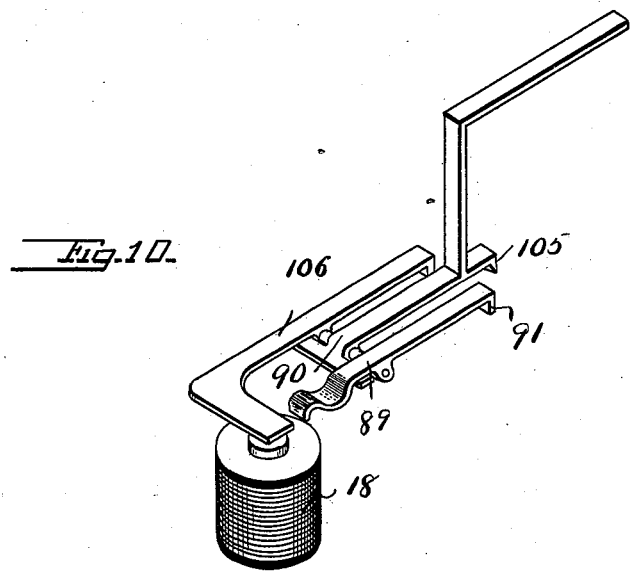
Witnesses.
Jesse B. Heller
Minnie T. Ellis
Inventor.
Lewis G. Rowand
by G. Hadley
Attorney.

UNITED STATES PATENT OFFICE.

LEWIS G. ROWAND, OF CAMDEN, NEW JERSEY, ASSIGNOR TO THE UNIVERSAL FIRE ALARM COMPANY, OF SAME PLACE.

AUTOMATICALLY TESTING FIRE-ALARM CIRCUITS.

SPECIFICATION forming part of Letters Patent No. 568,493, dated September 29, 1896.

Application filed August 2, 1895. Serial No. 557,961. (No model.)

*To all whom it may concern:*

Be it known that I, LEWIS G. ROWAND, a citizen of the United States, residing at Camden, county of Camden, and State of New Jersey, have invented a new and useful Improvement in Automatic Testing Fire-Alarm Circuits, of which the following is a full, clear, and exact description, reference being had to the accompanying drawings, which form a part of this specification.

Figure 1:
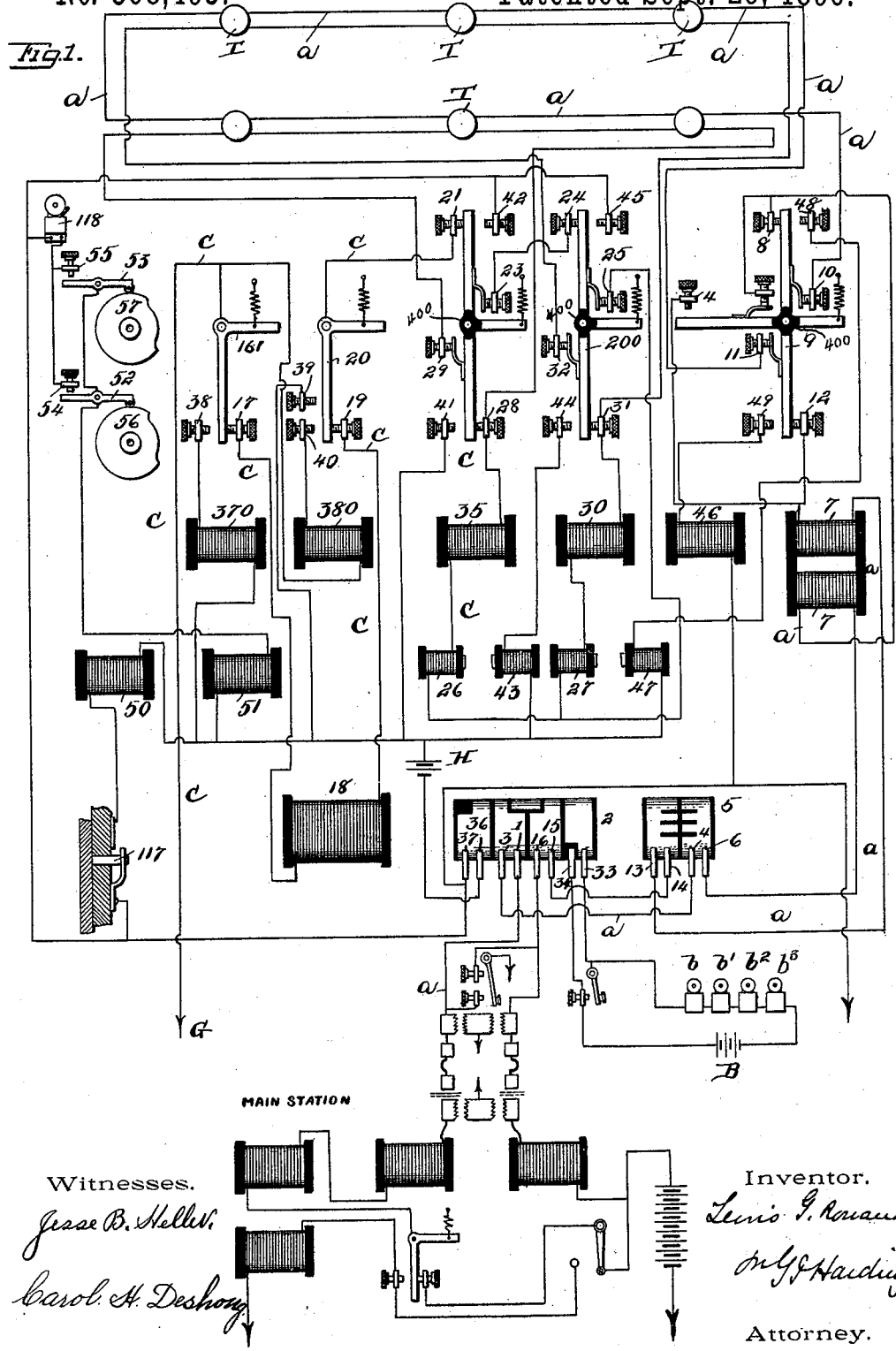
Figure 3:
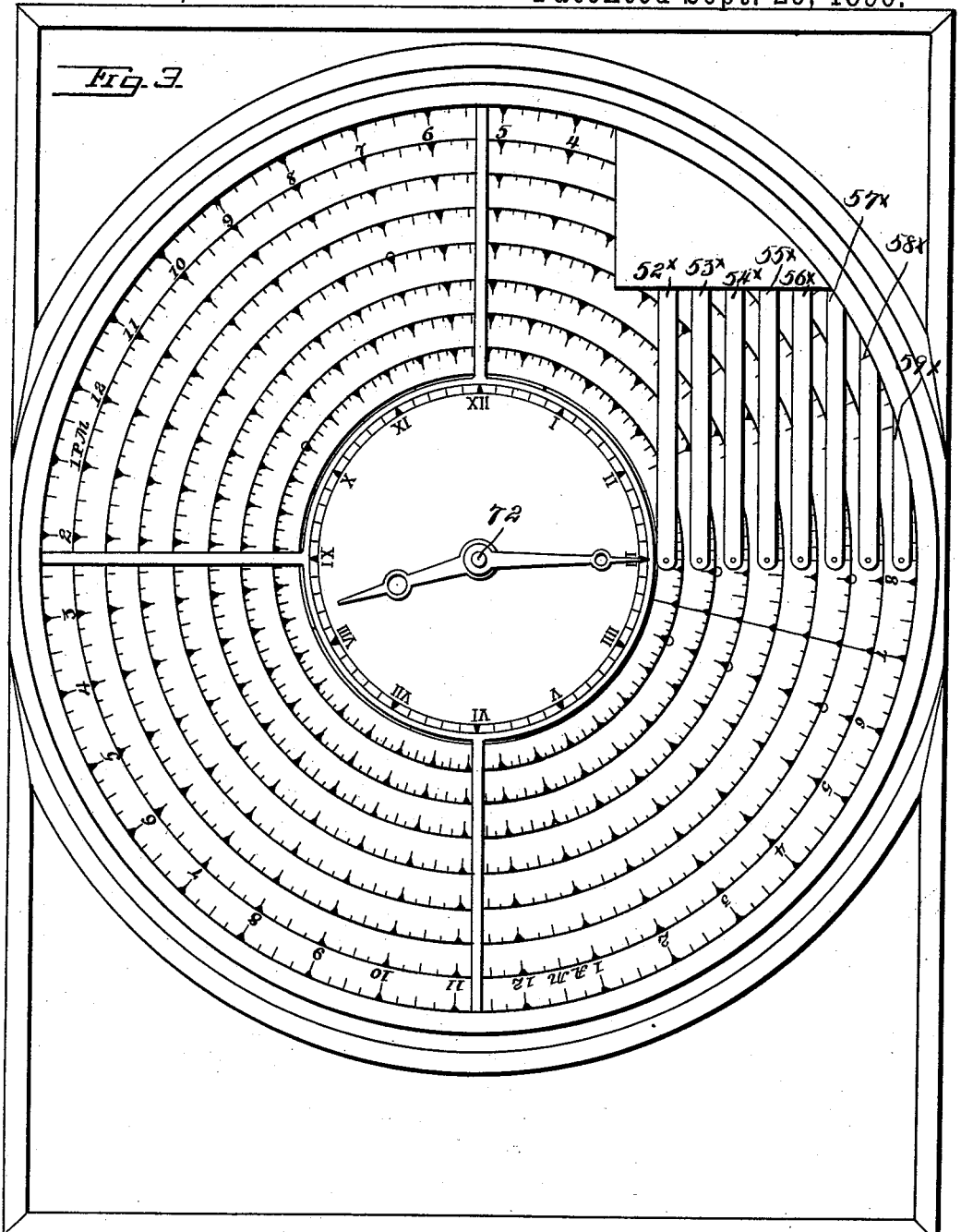
Figure 5:
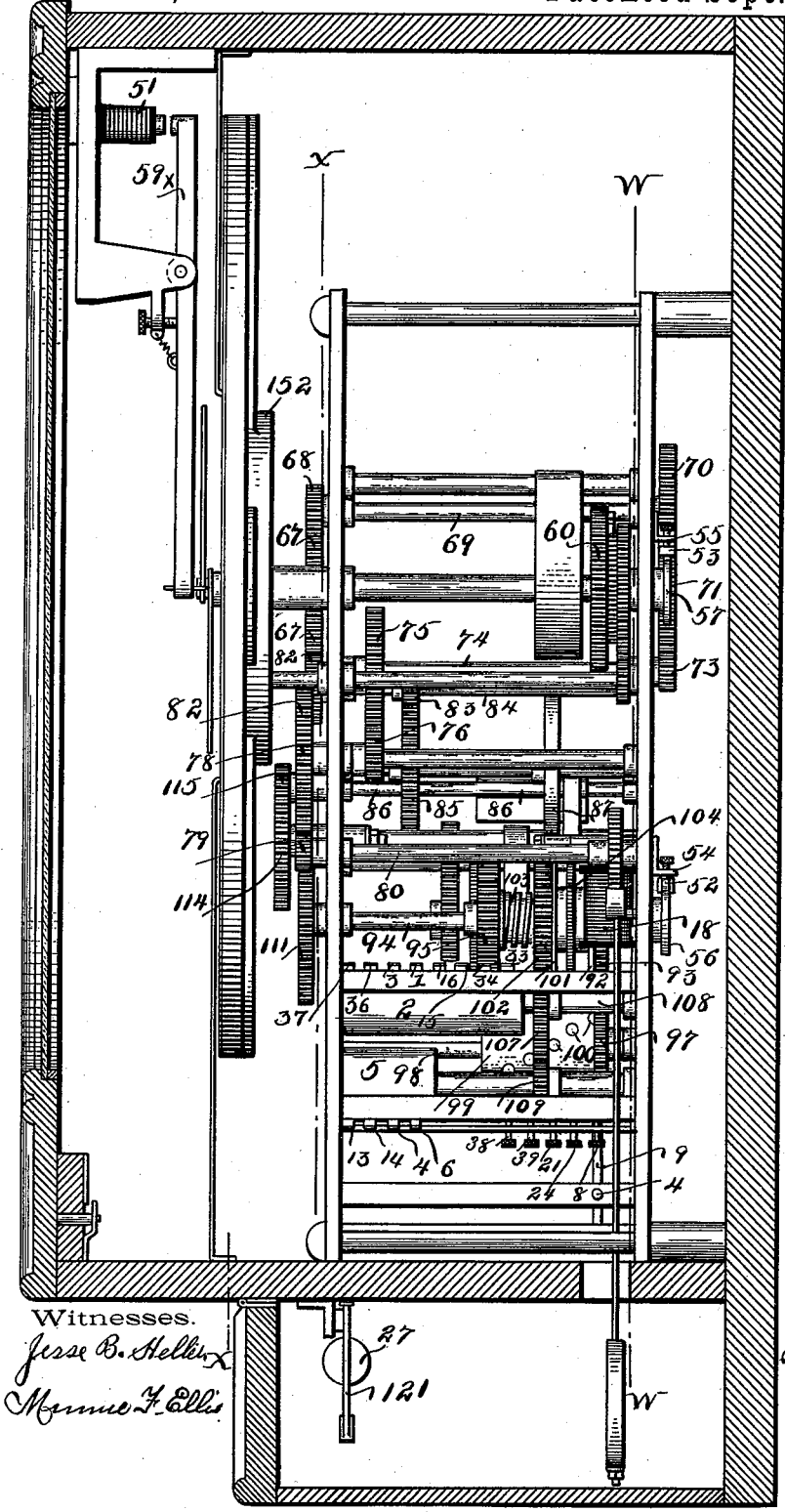
Figure 6:
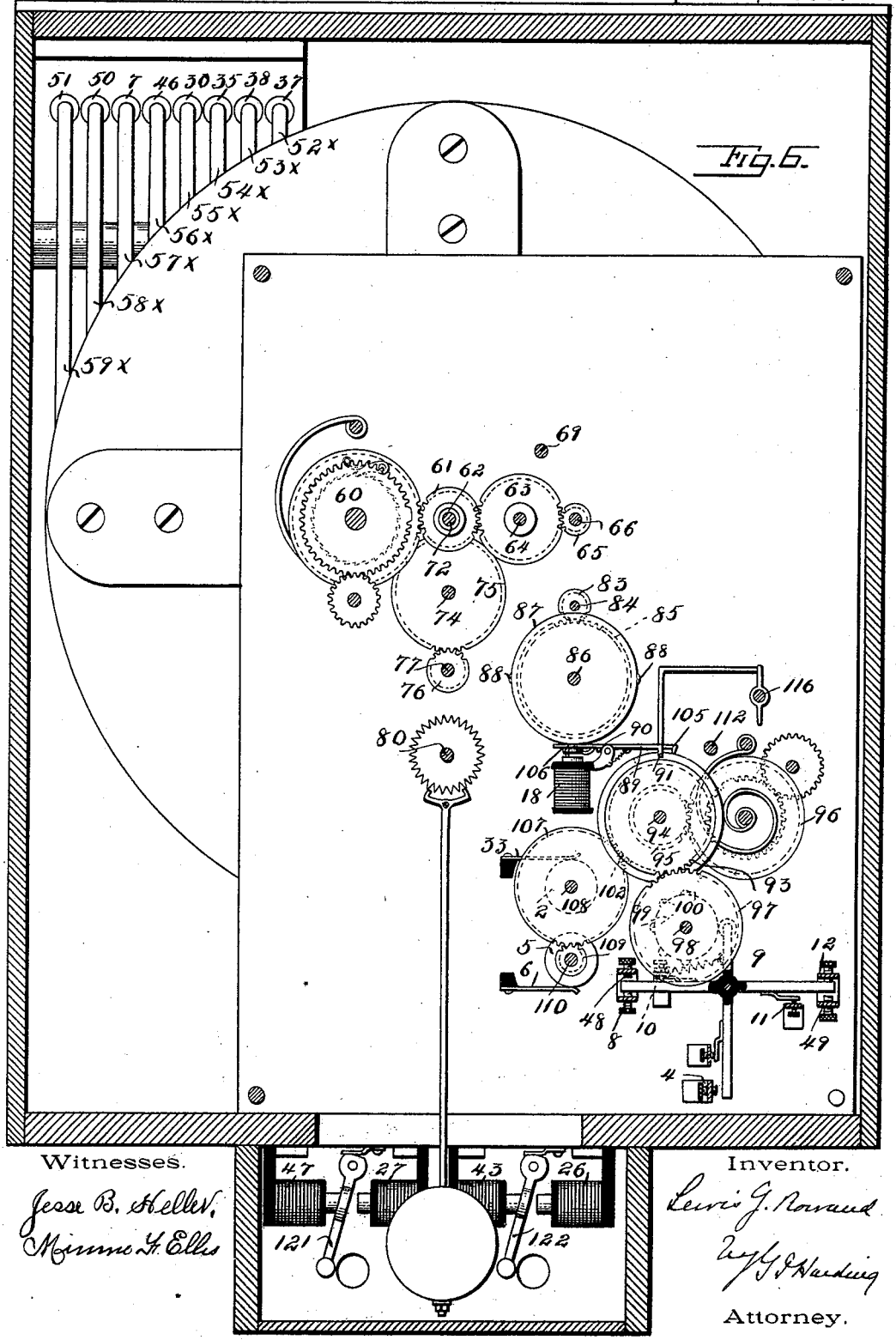
Figure 7:
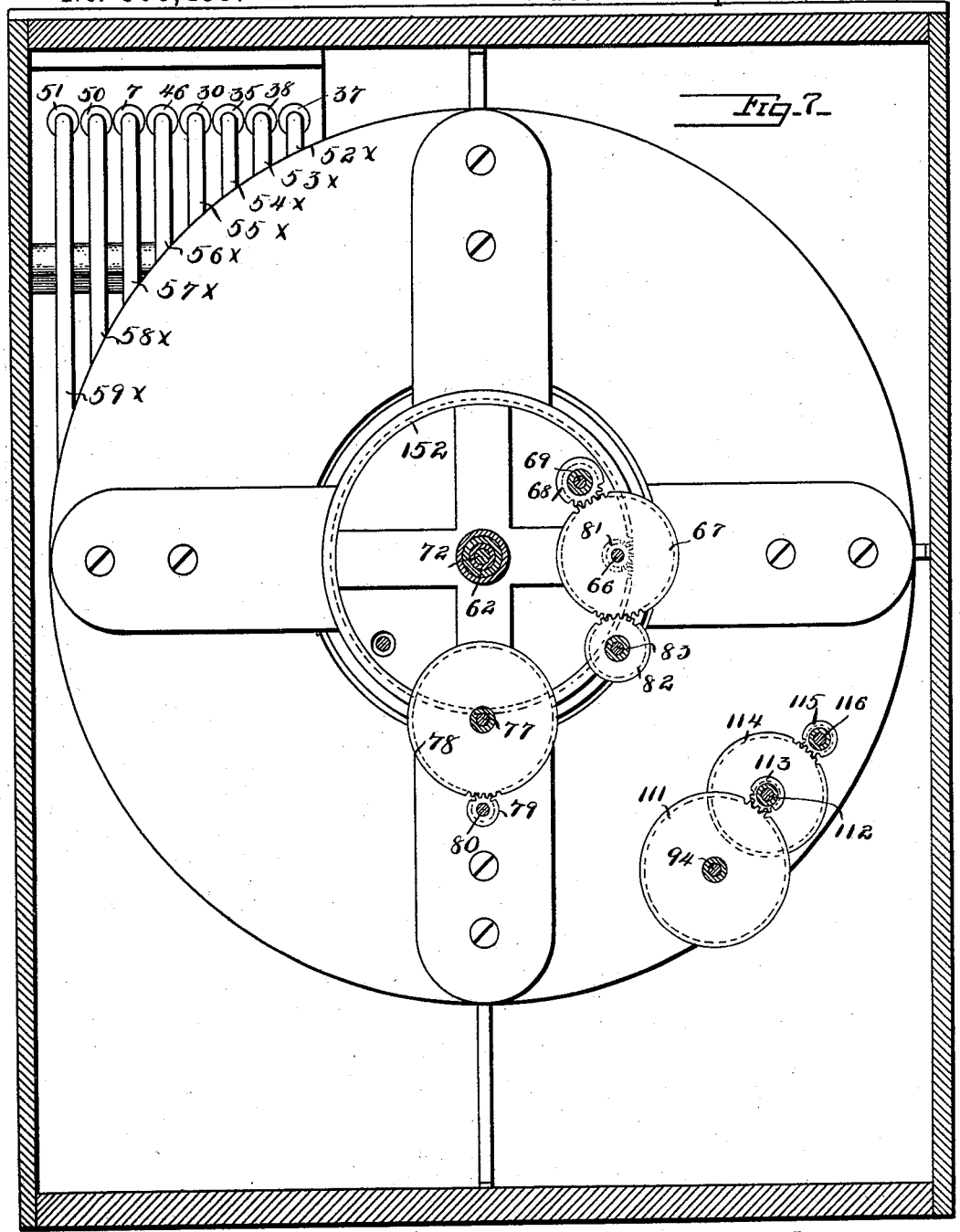
Figure 8:
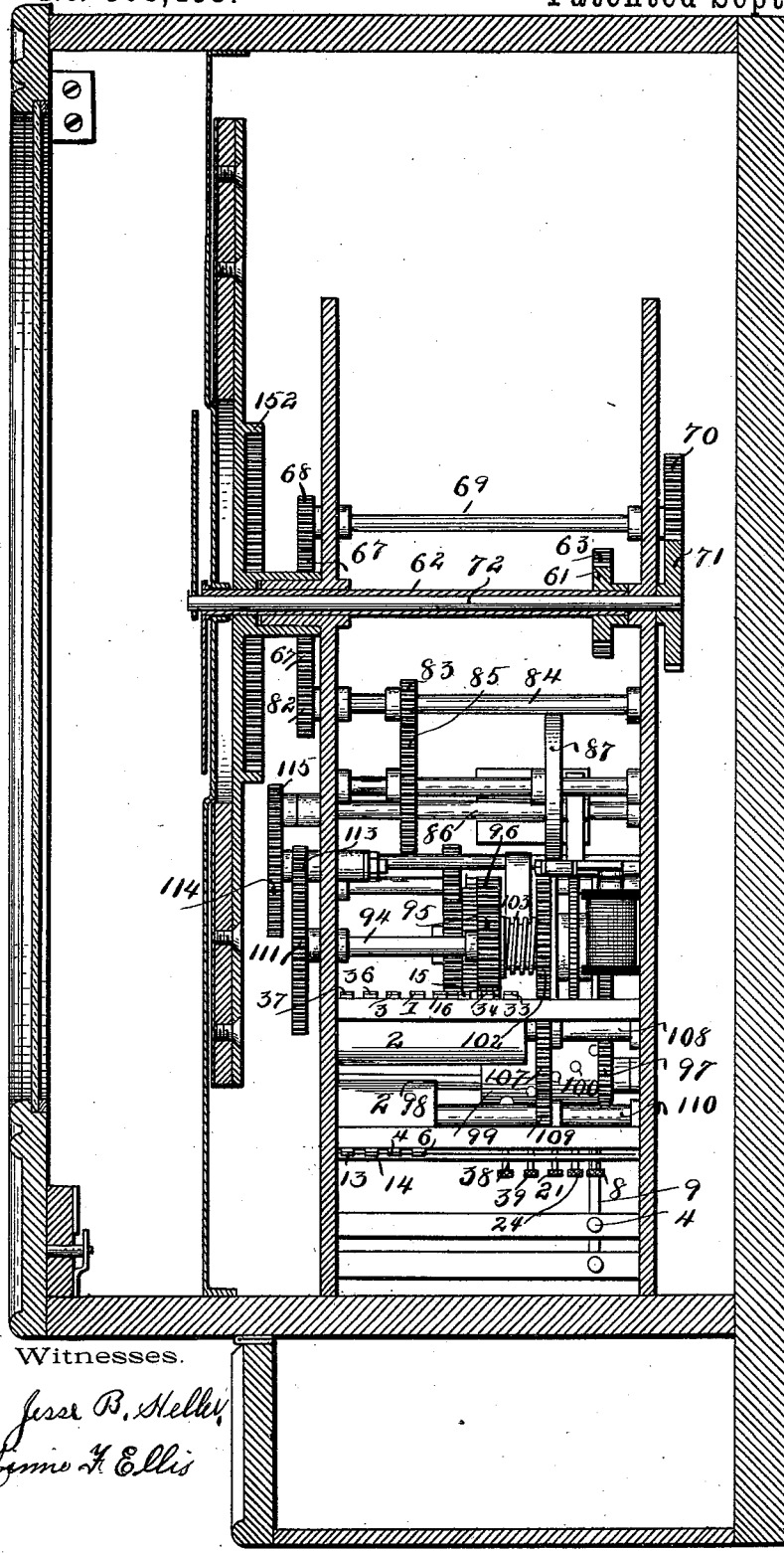

In the drawings, Figure 1 is a diagram of the electrical connections. Fig. 2 is a diagram of the gearing. Fig. 3 is a front view of the clock. Fig. 4 is a rear view of the same. Fig. 5 is a side elevation of the same. Fig. 6 is a section on the line $w\,w$, Fig. 5. Fig. 7 is a section on the line $x\,x$, Fig. 5. Fig. 8 is a section on the line $y\,y$, Fig. 4. Fig. 9 is a detail vertical section through the gears on the shaft 94. Fig. 10 is a detail perspective of the levers for releasing the switch and alarm mechanism.

My invention is to be used in connection with that class of fire-alarm-signaling apparatus wherein a battery, one pole of which is connected with the ground, is placed in the central station, and to the other pole is connected a loop-circuit which connects the station with the building and which passes through said building. Within the building and paralleling the first-mentioned circuit where fire protection is desired is a secondary loop or loops grounded, and between the local and station loops at desired points are thermostats, which when acted upon by heat connect the battery-circuit with the local ground-circuit, and thus close the circuit and operate a signal or signals.

My present improvement is designed to test these circuits and their appurtenances by means of a local battery, the various circuits, &c., being automatically by clock mechanism switched into circuit with the local battery.

In order to arrive more specifically at what I am carrying out in this invention, I will first refer to the diagram Fig. 1, in which two floors of a building protected by fire-indicating devices are shown.

The main-line wire $a$ enters the building through the lightning or high-current arrester and passes to the brush 1 on the commutator-disk 2. From thence it passes by the brush 3 through the wire to the brush 4 on the commutator-disk 5, thence by brush 6 through the wire to the magnet 7, from the magnet 7 to the binding-post 8 upon the switch 9, the central portion of which is insulated, as at 400, and from the binding-post 8 to the binding-post 10, thence through the two floors of the building to binding-post 11 on switch 9, to binding-post 12, from thence to the upper portion of the magnet 7, from thence to the brush 13 on commutator-disk 5, to brush 14, by wire to brush 15 on commutator-disk 2, to brush 16, and from brush 16 returns through the lightning-arrester to the battery at the main station.

C represents the building-wire, which is grounded at one end, denoted G, and passes from that ground to switch 161, to binding-post 17, through magnet 18 to binding-post 19, through switch 20 to binding-post 21 on switch 22, the center portion of that switch being also insulated, to binding-post 23, to binding-post 24 on switch 200, also having its central portion insulated, to binding-post 25, to either magnet 26 or 27.

Taking magnet 26 first, it passes through magnet 35 to binding-post 28, thence up and through the first floor of the building, then down and to binding-post 29, which makes a loop-circuit between binding-post 29, being electrically connected to binding-post 28. The wiring from magnet 27 passes through magnet 30 to binding-post 31, through the second floor of the building down to binding-post 32, which forms a loop-circuit, binding-post 3 being in electrical connection with binding-post 31. T are the theomostats connecting these loop-circuits with the main-line circuit $a$.

B is a local battery having in series the signals $b\,b'\,b^2\,b^3$. 33 and 34 are two brushes in this circuit resting upon the commutator-disk 2, one resting upon insulation under normal conditions and the other upon a metallic surface. Both commutator-disk 2 and commutator-disk 5 are operated by a spring, which is held normally out of action by a trip controlled by or forming the armature of the magnet 18.

When the thermostats make connection between the two circuits, the line-circuit and the local ground-circuit, the magnet 18 becomes energized, and releasing the spring commutator-drums 2 and 5. The releasing of the spring commutator-drum 2 closes the circuit from the battery B to the signals $bb'$, &c. At the same time, on account of the construction of the surface of the drum 5, the brushes upon it, which control the main line, by rotation of the drum, form a make and break which sounds the proper signal to a receiving instrument in the main station. Dependent upon which floor the thermostat acts on, either the magnet 26 or the magnet 27 is energized and draws over a signal in the box (see Fig. 4) denoting the floor.

In order to test the various circuits, I use a local test-battery H, one pole of which is connected through the brushes 36 and 37 with the ground, while from the other pole a wire passes to the magnet 370, from thence to the binding-post 38, which is normally out of contact with switch 161, but which, when switch 161 is in contact with it, forms connection directly with the ground through wire C, the purpose of this magnet 370 being to determine whether the ground is correct on the building-line and battery H. The magnet 380 is for testing if there be any ground throughout the building, the wiring from the local battery to operate this magnet passing to the binding-post 39, operating with switch 20, and, when the switch 20 moves so as to be in contact with binding-post 39, passes to contact 40, and thence through magnet 380 to ground. This magnet 380 is a high-resistance magnet, so that in case there should be any break in the building-line when the current from the local battery reaches the binding-post 39 it would be easier for it to pass along the switch 20 to wire C, and thence through the two floors of the building to wherever the ground might be, in preference to passing to ground through the high-resistance magnet. Magnet 35 is for testing whether there is any broken line in the first floor. Battery connection from battery H is to binding-post 41, which, when the switch 22 is moved so as to be in contact with it, passes to binding-post 29, thence to the first floor of the building, to binding-post 28, thence to magnet 35 and magnet 26 to binding-post 25, to binding-post 24, to binding-post 23, to binding-post 42, and to and around to brush 37, to brush 36 to the opposite pole of the battery.

Magnet 30 is for the purpose of testing the second floor, and the circuit from local battery H to it passes from one pole of the battery to the magnet 43, to binding-post 44, which, when the switch 200 is moved so as to be in contact with it, passes to binding-post 32, from thence through the second floor of the building to binding-post 31, thence through magnet 30 and magnet 27 to and through binding-post 25, to binding-post 45, to brush 37, to brush 36, to the other pole of the battery.

Magnet 46 is for the purpose of testing the main line within the building. The current from one pole of the local battery H passes through the magnet 47, from thence to binding-post 48, and, when switch 9 is turned, from thence to binding-post 10, thence through the building to binding-post 11, thence to binding-post 49, thence through magnet 46 to brush 37, thence to brush 36, thence to the other pole of the battery.

Magnet 7 is for the purpose of testing the main line outside of the building, and is used to enable a metallic circuit to be made through the magnet and the battery at main-line station, in which case the magnet becomes energized.

By a clock mechanism which will hereinafter be fully described the switches 161, 20, 22, 200, and 9 are automatically operated, so as successively to energize the magnets 37, 38, (provided there be no ground on the local building-circuit,) 35, 30, and 46. The magnet 50 is controlled by a circuit, which passes through the clock-door, so that when said clock-door is opened the magnet 50 is thrown into circuit with the local battery H.

Magnet 51 is in electrical connection with one pole of the local battery H, and the circuit passes through in series the pivoted levers 52 and 53, normally out of contact with corresponding contacts 54 and 55. The position of these contacts is controlled by the drums 56 and 57, respectively, 57 being controlled by the spring of the clock and 56 by the spring of the device which operates the switch device and commutators, and they are so set as to make a revolution within a predetermined period and so indicate the necessity of again winding the spring, the clock-spring, or the other spring.

When the trip 52 makes connection with the contact 54, the circuit is completed through the bell 118, and the same is true when the lever 53 makes contact with the contact 55.

In order to automatically operate these switches at regular and predetermined times and to record automatically the condition of the various circuits controlled by the five switches hereinbefore described, and also to record testing from the central station of the line-wire outside the building and to indicate the condition of the clock and registering mechanism, I employ the following means:

Speaking generally, I use a clock or watchman's clock which has upon its face, in addition to the ordinary clock-dial, a paper face divided into circles and also divided into sections corresponding to the periods of time. The surface or ring to which this paper is secured has upon it or is secured to the gear-wheel 152 and, resting adjacent to the various circular divisions upon the paper are pivoted levers having at the end adjacent to the paper an indicating device. These levers are numbered in the drawings (see Figs. 3 to 7, inclusive) $52^\times$, $53^\times$, $54^\times$, $55^\times$, $56^\times$, $57^\times$, $58^\times$, and $59^\times$, lever $52^\times$ being connected with or forming the armature of the magnet 370, $53^\times$ of magnet 38, $54^\times$ of magnet 35, $55^\times$ of magnet 30, $56^\times$ of magnet 46, $57^\times$ of magnet 7, $58^\times$ of magnet 50, and 59<sup>×</sup> of magnet 51. When any one of these magnets is energized, the corresponding lever is operated upon to make an indication-mark upon the paper. The paper is given a corresponding movement to the movement of the time-indicating devices of clock by the following mechanism:

60 is a gear-wheel controlled by the main-spring of a clock, which gears into a gear-wheel 61, secured to sleeve 62, loose on shaft 72, this wheel controlling the hour-hand. The gear-wheel 61 gears directly into a gear-wheel 63 on the shaft 64. This gear-wheel 63 gears into a gear-wheel 65 upon the shaft 66. Upon the same shaft 66 is a gear-wheel 67, which gears into a gear-wheel 68 on the shaft 69. On the shaft 69 is the gear-wheel 70, which gears into a gear-wheel 71, secured to shaft 72, which last-mentioned gear-wheel 71 controls the movement of the minute-hand. This gear-wheel 71 is on the shaft 72 and gears into the gear-wheel 73 on the shaft 74. On the same shaft is the gear-wheel 75, which gears into the gear-wheel 76 on the shaft 77, and on this shaft 77 is the gear-wheel 78, which gears into the gear-wheel 79 on the shaft 80, which controls the escapement.

On the shaft 66 is the gear-wheel 81, which meshes with the gear-wheel 152, controlling the movement of the paper. The gear 67 on the shaft 66 meshes with the gear 82 on the shaft 83. On this shaft 83 is the gear 84, which meshes with the gear-wheel 85 on the shaft 86.

Referring to Figs. 2, 7, 9, and 10, on the shaft 86 is the plane-faced wheel 87, which is so adjusted by gearing as to make one revolution every twenty-four hours, and upon this wheel 87, at opposite points, are projections 88, arranged to strike one end of the lever 89, this same end of the lever 89 resting over the flanged end of a bell-crank lever 90. The lever 89 has a toe-piece 91 at the opposite end, which rests in a detent on the flange 92 of a gear-wheel 93, loose upon the shaft 94. On this shaft 94 is the gear-wheel 95, fixed upon the shaft. This gear-wheel 95 gears into a spring gear-wheel 96. The gear-wheel 93 gears into a gear-wheel 97 on the shaft 98. On the shaft 98 is a cylinder 99, having arranged at different points along its length and circumference projections 100, corresponding in number and in position to the five switches.

On the shaft 94 is the disk 101, having a detent therein and being provided with the geared flange 102, the said disk 101, with its flange, being loose upon the shaft 94, the disk 101, with its flange 102, being connected with the gear-wheel 95 by the friction connection 103.

Upon the shaft 94 and keyed to said shaft is the cylindrical disk 104, having detents all around its periphery, and a toe-piece 105 on the lever 90 is adapted to rest in said detents. The toe-piece on the lever 106 is adapted to rest in the detent in the disk 101. This lever 106 forms the armature of the magnet 18. The wheel 102 meshes into the gear-wheel 107 on the shaft 108. On this shaft 108 is the commutator-disk 2. The gear-wheel 107 meshes into the gear-wheel 109 on the shaft 110, upon which is the commutator-disk 5, the arrangement of the gear-wheel being such that the commutator-disk 2 makes one revolution to the four revolutions of the commutator-disk 5.

The gear-wheel 111 on the shaft 94 meshes with the gear-wheel 112 on the shaft 113. Upon this shaft 113 is the wheel 114, meshing with the gear-wheel 115, carrying upon its shaft 116 a governing device. The arrangement of the gearing from the gear-wheel 111 to gear-wheel 116 is for the purpose of adjusting the speed of the mechanism. As may be readily seen from this arrangement, so far as testing for a fire is concerned, if any of the thermostats act the magnet 18 becomes energized, controlling and moving the lever 106, thereby releasing the wheel 101. This movement of the lever 106, by reason of the fact that it also rests over the flanged end of the lever 90, releases the wheel 104 on the shaft 94. The releasing of the wheel 104 allows the spring-wheel 96 to operate upon the wheels 95 and rotate the shaft. The releasing of the wheel 101 allows, through the medium of the friction 103, the gear 102 to revolve with the gear 95 and with the shaft 94, which, through the medium of commutator 2, hereinbefore described, causes the various bells $b$ $b'$ $b^2$ to act, and through the medium of the commutator-disk 5 the desired make-and-break signal is given to the station.

There are on the gear 101 two notches placed adjacent to each other, so as to prevent a complete revolution of the wheel 101 and thus prevent a complete revolution of the commutator-disk 2, and the brushes 1 and 3 are caused to stop upon insulation, and also the brush 37 is caused to stop upon insulation, so that the local battery and the main line, after such signal has been given, are both cut out of circuit until by hand the proper change is made. This can readily be done by moving the lever 106 down by hand and allowing the spring to move the wheel 101 the distance to the notch in which initially the toe of lever 106 rested, when it is again allowed to drop into it, and the apparatus is brought to its initial position. As may be seen, during this operation the lever 89 is not moved. As a consequence, the disk 92, with its appurtenant gear 93, is held from revolution, and as a consequence during a fire-signal no disturbance of the switches takes place.

Now taking up next the automatic operation of the switches, when either of the lugs 88 strikes the lever 89 through the medium of the lever 90, it releases wheels 92 and 104. The consequence is that the shaft 94 is released and the spring-wheel 96, acting upon the gear 95 and spring-clutch 300, causes the shaft to revolve, revolving with it the gear 93, and this gear 93 revolves gear 97 on the shaft 98, and thus revolving the cylinder 99 upon the same shaft, and the lugs 100 successively trip the five switches, energizing the five magnets 87, 38, 35, 30, and 46, and which magnets act upon their corresponding levers 52ˣ 53ˣ 54ˣ 55ˣ 56ˣ successively, causing successive indications to be made on the paper. Of course, as hereinbefore described, the magnet 380 and its appurtenant switch 20 are used for the purpose of testing ground on the local building-line, and, as before described, is a high-resistance magnet, and, if there is no ground on the line, does not indicate.

So far as the operation of the magnet 50 and its appurtenant lever 58 is concerned, from the diagram it may readily be seen that that magnet is in series with the local battery, the circuit being normally open when the door 117 of the clock is closed, and therefore this only indicates whenever the clock has been opened, and indicates merely for the purpose of preventing tampering with the clock.

The magnet 51, which is used to indicate the condition of the clock-spring and the spring-wheel 96, is, as may be seen, in series with the local battery H and also a bell 118, the circuit having two switch-levers 52 and 53, 52 being controlled by a disk 56, secured on the shaft of the spring-wheel 96, the arrangement being such that the spring-shaft makes one revolution a day, and the inset in the wheel 56 is so set as to trip off a short time before the shaft has made a complete revolution. Of course this may be adjusted any way desired. It is not intended to be limited to a spring which runs down in a day or any particular period, the arrangement merely being that this wheel or disk 56 shall trip off the switch and close the circuit before the spring has run down. The other switch-lever 53 is controlled by a disk 57, which is upon the shaft of the clock spring-wheel 60, and the same statement as to disk 56 is applicable to this.

The magnet 7 can be energized, as before described, by connecting the two line-wires at the central station to the opposite poles of the battery, when the main-line circuit through the building is thus complete independent of the local ground-circuit, and said magnet 7 becomes energized and operates upon its corresponding lever 57ˣ and makes indication. The magnets 26 and 27 are controlled by the circuits of corresponding floors, and move the armatures 121 and 122, respectively, so as to display the indication first or second floor, dependent upon which floor is operated. Now, of course, when these magnets are energized by means of the thermostats, the returning of the circuit to its normal condition will allow the indicator to return, but where these magnets become energized by reason of the testing of the switches it is necessary to provide automatic means for returning the indicating devices to their proper position, and this is accomplished by means of the magnets 43 and 47, 43 being thrown into circuit, as may be clearly seen by the diagram Fig. 1, when the switch 200 is operated, and the magnet 47 being thrown into action when the switch 9 is operated, so that in the successive switch testing, while initially these indications will be made, they will, by the movement of the subsequent switches, be returned to their normal position. By this construction, as may be seen, I can test first to see whether the grounds in the local building-circuit and the local battery are correct. I can test whether there is any ground in the local building-circuit independent of the proper ground. I can test whether the circuit to the first floor is correct and the circuit to the second floor is correct. I can test whether the main line through the building is correct. I can also test whether the main line from the station is correct, and all of these tests are made without giving any alarm, either in the building or at the main station, and there is a register made of these tests. By this construction also, when the circuit is completed by means of a thermostat acting, I not only give an alarm at the main station and an alarm at the local station, but I also indicate upon this paper dial the alarm. I am also enabled to test and indicate the test made as to whether the main-line circuits are all right, and whether the spring mechanism, both of the clock and of the mechanism to operate the commutator-disk and the switch-tripping devices, are also all right.

Having now fully described my invention, what I claim, and desire to protect by Letters Patent, is—

1. In an automatic fire-signaling mechanism, the combination with a central or main battery, one pole grounded, a main-loop circuit from the other pole of the main battery, said main circuit including the building to be protected, and a series of independent building-loops, having a common ground connection, paralleling the main line at desired points, a local or test battery in normally open circuit, and a switch device adapted to connect the local battery with the building-loops and the building-loops ground, and a high-resistance magnet in said last-mentioned circuit controlling an indicating device.

2. In an automatic fire-signaling mechanism, the combination with a central or main battery, one pole grounded, a main-loop circuit from the other pole of the main battery, said main circuit including the building to be protected, and a series of independent building-loops, having a common ground connection, paralleling the main line at desired points, a local or test battery in normally open circuit, one pole of said battery being grounded, and a switch device adapted to connect the local battery with the building-loops and the building-loops ground, and a high-resistance magnet in said last-mentioned circuit controlling an indicating device.

3. In combination with a central or main battery, one pole grounded, a main-loop circuit from the other pole of the main battery including the building to be protected, and a series of independent building-loops having a common ground paralleling the main line at desired points, a local or test battery having one pole grounded, and normally open-circuited, a switch adapted to connect said local battery and the building-circuit-loops ground, a switch adapted to connect said battery with the building-circuit-loops ground and building-circuit loops, independent switches each adapted to connect said building with one of said building-loops, and a switch adapted to connect said battery with the main line within the building, each circuit so formed having on it an electromagnet, and each magnet controlling an indicating device, and means to successively operate said switches.

4. In combination with a central or main battery, one pole grounded, a main-loop circuit from the other pole of the main battery including the building to be protected, and a series of independent building-loops having a common ground paralleling the main line at desired points, a local or test battery having one pole grounded and normally open-circuited, a switch adapted to connect said local battery and the building-circuit-loops ground, a switch adapted to connect said battery with the building-circuit-loops ground and building-circuit loops, independent switches each adapted to connect said building with one of said building-loops, and a switch adapted to connect said battery with the main line within the building, each circuit so formed having on it an electromagnet, and each magnet controlling an indicating device, a clock having a paper disk given a relative movement to the movement of clock-time devices, the aforementioned indicating devices being adapted to register on said disk, a spring-impelled disk normally held from action adapted to successively operate said switch, and mechanism adapted at predetermined times to release said spring-impelled disk.

5. In combination with a central or main battery, one pole grounded, a main-loop circuit from the other pole of the main battery including the building to be protected, and a series of independent building-loops having a common ground paralleling the main line at desired points, a local or test battery having one pole grounded and normally open-circuited, a switch adapted to connect said local battery and the building-circuit-loops ground, a switch adapted to connect said battery with the building-circuit-loops ground and building-circuit loops, independent switches each adapted to connect said building with one of said building-loops, and a switch adapted to connect said battery with the main line within the building, each circuit so formed having on it an electromagnet, and each magnet controlling an indicating device, a clock having a paper disk given a relative movement to the movement of clock-time devices, the aforementioned indicating devices being adapted to register on said disk, a spring-impelled disk normally held from action, adapted to successively operate said switch, and mechanism adapted at predetermined times to release said spring-impelled disk, an electromagnet between each building-loop and the building-loop ground controlling an indicating device, and a magnet on the circuit of the contiguous building-loop with the local or test battery for returning the indicating device to its normal position.

6. In combination with a central or main battery, one pole grounded, a main-loop circuit from the other pole of the main battery including the building to be protected, and a series of independent building-loops having a common ground paralleling the main line at desired points, a local or test battery having one pole grounded and normally open-circuited, a switch adapted to connect said local battery and the building-circuit-loops ground, a switch adapted to connect said battery with the building-circuit-loops ground and building-circuit loops, independent switches each adapted to connect said building with one of said building-loops, and a switch adapted to connect said battery with the main line within the building, each circuit so formed having on it an electromagnet, and each magnet controlling an indicating device, a clock having a paper disk given a relative movement to the movement of the clock-time devices, the aforementioned indicating devices being adapted to register on said disk, a spring-impelled disk normally held from action, adapted to successively operate said switch, and mechanism adapted at predetermined times to release said spring-impelled disk, a normally open circuit including the local battery, a signal and a switch device controlled by a disk operated by clock-spring, a magnet in said circuit, and an indicating device controlled by said magnet.

7. In combination with a central or main battery, one pole grounded, a main-loop circuit from the other pole of the main battery including the building to be protected, and a series of independent building-loops having a common ground paralleling the main line at desired points, a local or test battery having one pole grounded and normally open-circuited, a switch adapted to connect said local battery and the building-circuit-loops ground, a switch adapted to connect said battery with the building-circuit-loops ground and building-circuit loops, independent switches each adapted to connect said building with one of said building-loops, and a switch adapted to connect said battery with the main line within the building, each circuit so formed having on it an electromagnet, and each magnet controlling an indicating device, a clock having a paper disk given a relative movement to the movement of clock-time devices, the aforementioned indicating devices being adapted to register on said disk, a spring-impelled disk, normally held from action, adapted to successively operate said switch, and mechanism adapted at predetermined times to release said spring-impelled disk, a normally open circuit including the local battery, a signal and a switch device controlled by a disk controlled by the spring of the hereinbefore-mentioned spring-impelled disk, and a magnet in said circuit and an indicating device controlled by said magnet.

8. In combination with a central or main battery, one pole grounded, a main-loop circuit from the other pole of the main battery including the building to be protected, and a series of independent building-loops having a common ground paralleling the main line at desired points, a local or test battery having one pole grounded and normally open-circuited, a switch adapted to connect said local battery and the building-circuit-loops ground, a switch adapted to connect said battery with the building-circuit-loops ground and building-circuit loops, independent switches each adapted to connect said building with one of said building-loops, and a switch adapted to connect said battery with the main line within the building, each circuit so formed having on it an electromagnet, and each magnet controlling an indicating device, a clock having a paper disk given a relative movement to the movement of clock-time devices, the aforementioned indicating devices being adapted to register on said disk, a spring-impelled disk normally held from action adapted to successively operate said switch, and mechanism adapted at predetermined times to release said spring-impelled disk, a normally open circuit including the local battery, and a switch controlled by the clock-door, an electromagnet in said circuit, and an indicating device controlled by said magnet.

9. In combination with a central or main battery, one pole grounded, a main-loop circuit from the other pole of the main battery including the building to be protected, a commutator-disk as 2, adapted to be rotated, through which said main loop passes on entering and departing from the building through brushes, a local test-battery, the circuit from which passes through said disk through brushes, a series of independent building-loops having a common ground and paralleling the main line at the desired points, thermostats at desired points adapted to connect the main and building loop an electromagnet on the building-loop circuits between the loops and ground controlling the rotation of said commutator-disk, and means to prevent the commutator-disk making a complete revolution, the commutator-disk being so constructed and provided at such points with insulating material that when it stops rotation the passage of current from the main line is cut out by insulation.

10. In combination with a central or main battery, one pole grounded, a main-loop circuit from the other pole of the main battery including the building to be protected, a commutator-disk, as 2, adapted to be rotated, through which said main loop passes on entering and departing from the building through brushes, a local test-battery, the circuit from which passes through said disk through brushes, a series of independent building-loops having a common ground and paralleling the main line at the desired points, thermostats at desired points adapted to connect the main and building loops, an electromagnet on the building-loop circuits between the loops and ground controlling the rotation of said commutator-disk, and means to prevent the commutator-disk making a complete revolution, the commutator-disk being so constructed and provided at such points with insulating material that when it stops rotation the passage of current from the test-battery is cut out by insulation.

11. In combination with a central or main battery, one pole grounded, a main-loop circuit from the other pole of the main battery including the building to be protected, a commutator-disk as 2, adapted to be rotated, through which said main loop passes on entering and departing from the building through brushes, a local test-battery, the circuit from which passes through said disk through brushes, a series of independent building-loops having a common ground and paralleling the main line at the desired points, thermostats at desired points adapted to connect the main and building loop, an electromagnet on the building-loop circuits between the loops and ground controlling the rotation of said commutator-disk, and means to prevent the commutator-disk making a complete revolution, the commutator-disk being so constructed and provided at such points with insulating material that when it stops rotation the passage of current from the main line is cut out by insulation, a local battery, a normally open circuit including signals passing through said commutator-disk, the arrangement being such that in the revolution of said disk the circuit is closed to said signals.

In testimony of which invention I have hereunto set my hand.

LEWIS G. ROWAND.

Witnesses:
FRANK S. BUSSER,
MINNIE F. ELLIS.